April 16, 1968

G. M. FULMER 3,378,276

HYDRAULICALLY OPERATED DEMOUNTABLE RUNNING
GEAR WITH DIAGONAL RAMS

Filed June 14, 1965

George M. Fulmer
INVENTOR.

BY Clarence A. O'Brien
and Harvey B. Jackson
Attorneys

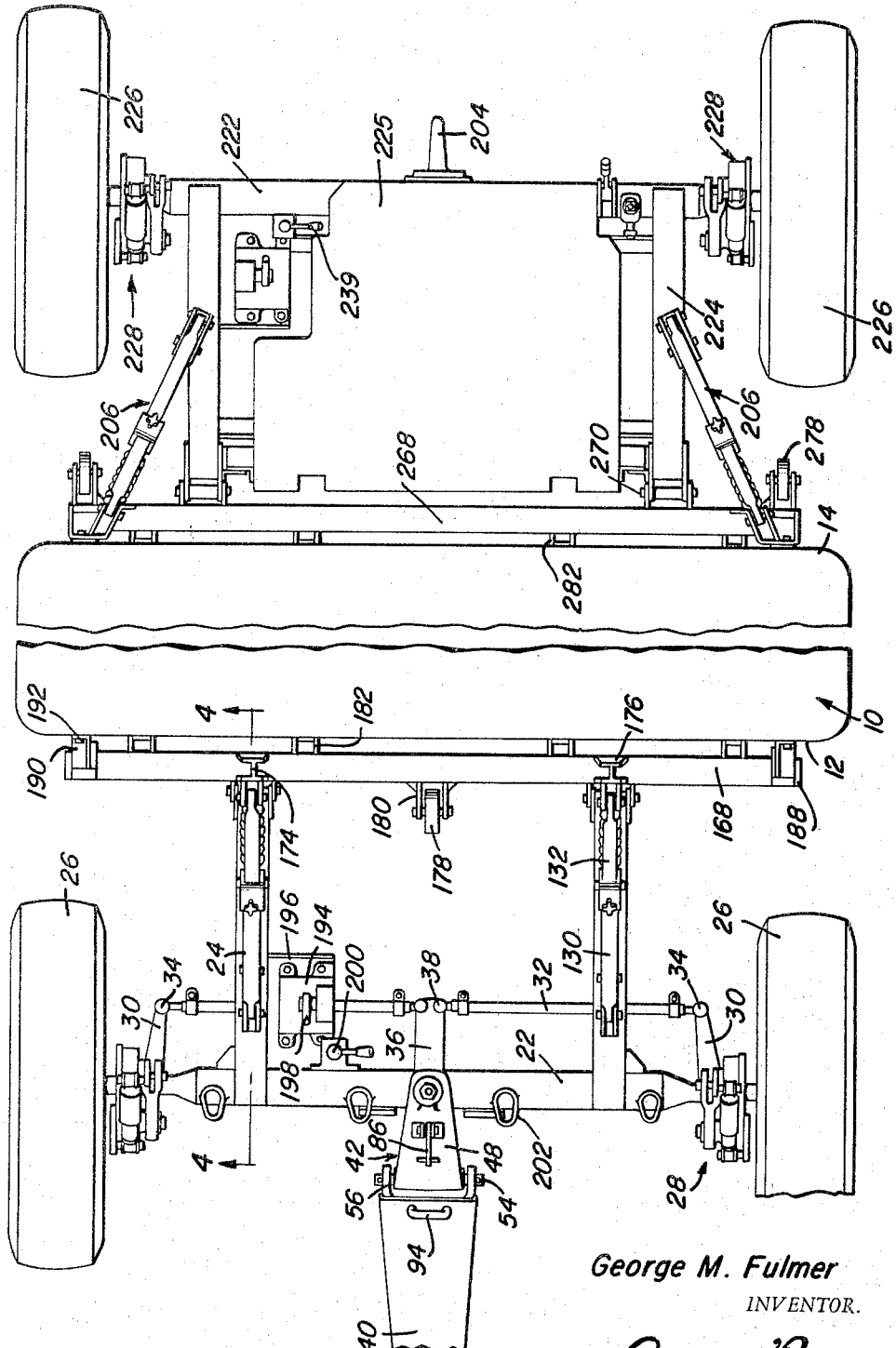

April 16, 1968
G. M. FULMER
3,378,276
HYDRAULICALLY OPERATED DEMOUNTABLE RUNNING
GEAR WITH DIAGONAL RAMS
Filed June 14, 1965
5 Sheets-Sheet 3
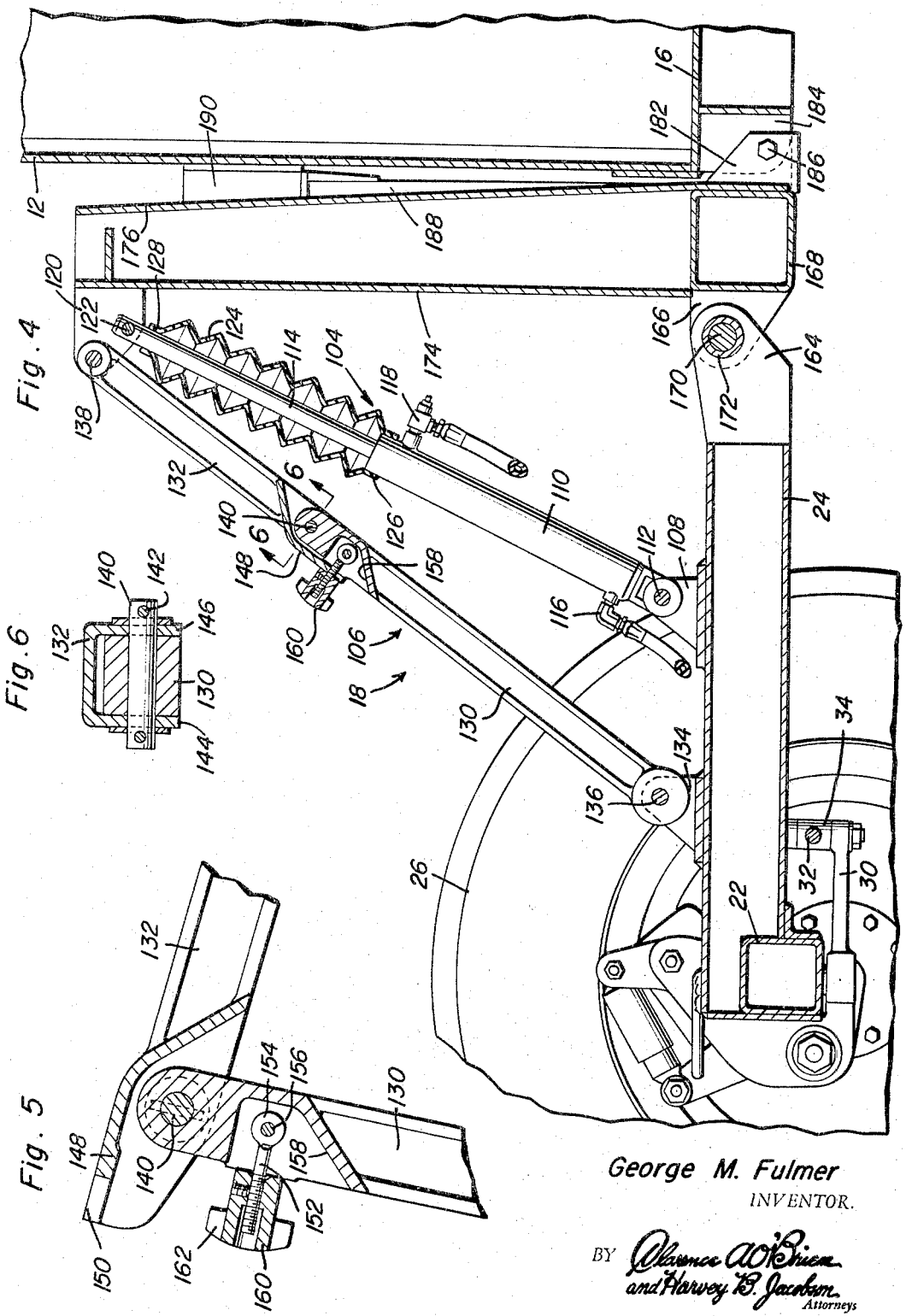
George M. Fulmer
INVENTOR.
BY *Clarence A. O'Brien*
*and Harvey B. Jacobson*
Attorneys

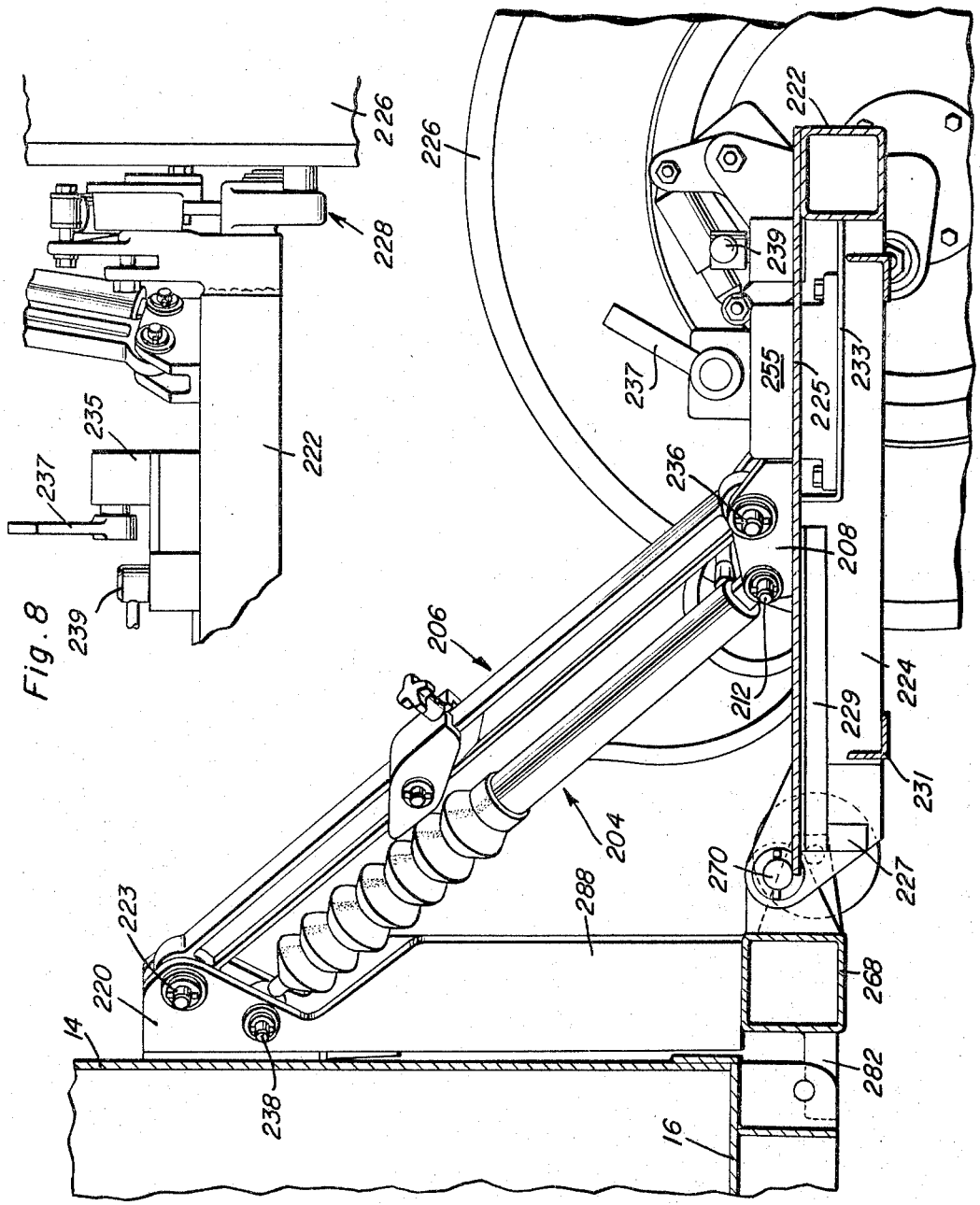

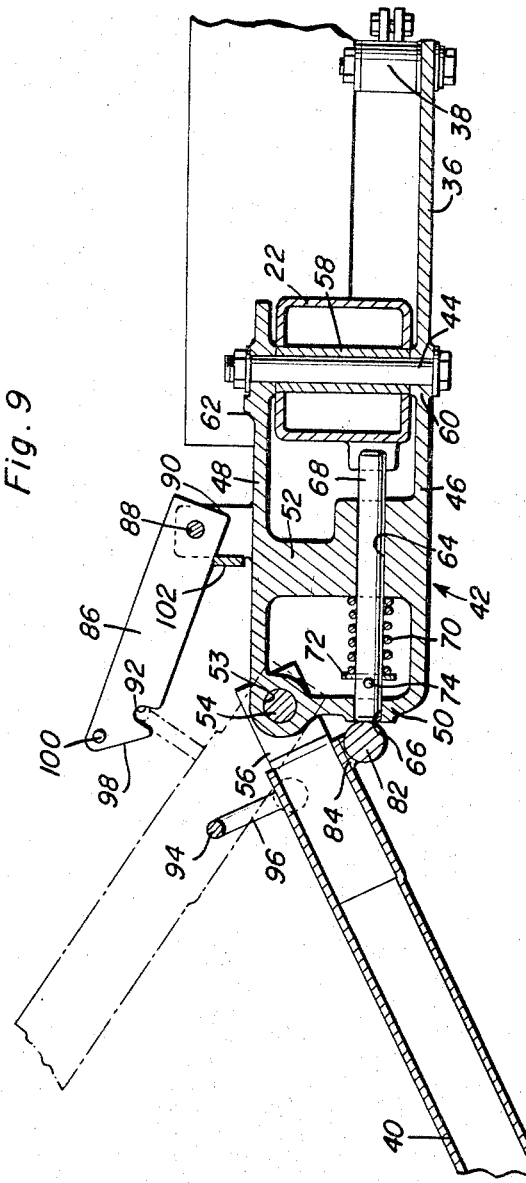
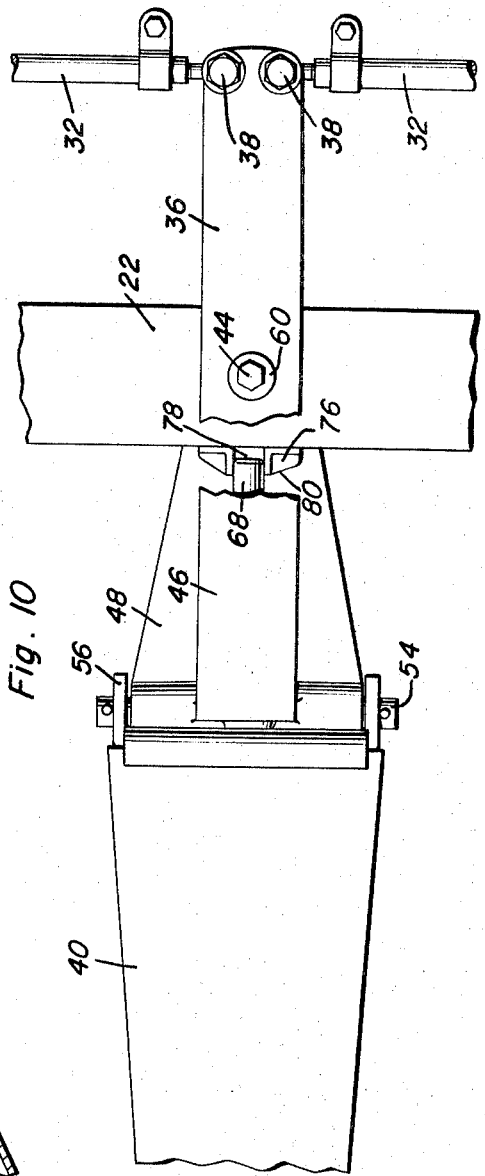

United States Patent Office 3,378,276
Patented Apr. 16, 1968

3,378,276
HYDRAULICALLY OPERATED DEMOUNTABLE
RUNNING GEAR WITH DIAGONAL RAMS
George M. Fulmer, Silver Spring, Md., assignor to Gichner Mobile Systems, Inc., a corporation of Maryland
Filed June 14, 1965, Ser. No. 463,510
13 Claims. (Cl. 280—43.23)

The present invention generally relates to a demountable running gear for attachment to a body unit such as shelter enclosure, a load carrying body or the like and more particularly represents various improvements in that construction illustrated in prior Patent No. 2,968,490 issued Jan. 17, 1961 for a Demountable Running Gear and also certain improvements in copending application Ser. No. 380,991 filed July 2, 1964 by George M. Fulmer and Royal G. Bivins for Hydraulically Operated Demountable Running Gear.

An object of the present invention is to provide a demountable running gear for a load carrying body or shelter of rigid construction with the running gear including an improved and novel means for elevating the load carrying body to which the running gear is attached from an at-rest position on a floor or ground surface to an elevated position whereby the body may then be easily towed over various surfaces by the use of a suitable towing vehicle. The front running gear is provided with a tongue operatively associated with the front wheels for imparting steering movement to the front wheels for controlling the direction of movement of the elevated body and the running gears. This tongue and the associated axle structure is provided with a mechanism which will lock out the steering mechanism when the tongue is disconnected from a towing vehicle and dropped towards the ground surface so that it extends downwardly in an inclined direction in relation to its normal position when the body and running gear assembly is being towed.

In addition to the above significant feature, the lifting mechanism for elevating the body includes a pair of hydraulically operated piston and cylinder assemblies on the front and rear running gear, respectively, with the longitudinal axis of the piston and cylinder assemblies being inclined with the point of attachment to the body being spaced apart a greater distance than the point of attachment to the respective running gear. This arrangement of piston and cylinder assemblies may be provided on only the rear running gear to provide space for opening of an access door in a shelter or it may be provided on the front or on both running gears depending upon the nature of the body being associated with the running gears.

Another feature of this invention is the provision of double-acting piston and cylinder assemblies orientated in the manner described in the preceding paragraph so that the load carrying body or shelter may be elevated and also enabling the axle and wheels on the ends thereof to be elevated off of the ground surface by lowering the body and then continuing to actuate the piston and cylinder assemblies to elevate the running gears from contact with the ground surfaces thereby facilitating wheel and tire replacement in the event of the flat tire occurring or in the event of other repairs being necessary, and also permitting the wheels to clear projections when the shelter or pallet is moved into an aircraft on conveyors or a roller system.

Still another object of the present invention is to provide a load carrying body and running gear assembly associated with each end thereof in accordance with the preceding object and further including a foldable brace interconnecting the frame components of the running gear assembly whereby the running gear assemblies may be locked in their position of elevating the body to its transporting position. The locking structure includes a pair of brace elements that are pivotally interconnected at adjacent ends with the remote end thereof being pivotally connected or associated with the running gear frame and load carrying body so that as the load carrying body is elevated, the brace or locking structure will be unfolded toward a straight line position and a manually operated retaining mechanism is provided for retaining the pivotally connected element forming the brace in a straight line condition or substantially straight line condition thereby enabling the hydraulic pressure in the piston and cylinder assemblies to be released if desired.

Another object of the present invention is to provide a running gear in accordance with the preceding objects that is easily connected with the load carrying body or unit and is provided with small wheels at the point provided for an attachment with the load carrying body to facilitate movement of the running gear into associated relationship to the load carrying body for connection therewith.

Another object of the present invention is to provide a running gear for a vehicle having a front axle with steerable wheels thereon and a pivotal tongue operatively associated with the wheels for controlling the position thereof with the tongue being swingable in a vertical plane so that when it is detached from a towing vehicle, the tongue will drop downwardly toward a ground surface or the like. The tongue and a stationary part of the running gear are interconnected by a mechanism which is automatically actuated when the tongue is pivoted downwardly for the purpose of preventing pivotal movement of the tongue when it is in its downwardly inclined position detached from a towing vehicle thereby preventing accidental or undesirable pivotal movement of the steerable wheels when the tongue is disconnected from the towing vehicle.

Yet other important objects of the present invention reside in the ease of attaching and detaching the running gear to the load carrying body, its simplicity of construction, its rugged and dependable structural characteristics and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a top plan view of the detachable running gear with a portion of the load unit removed and illustrating the structural arrangement of the running gear and the load carrying body or shelter;

FIGURE 4 is a vertical sectional view, on an enlarged scale, taken substantially upon a plane passing along section line 4—4 of FIGURE 3 illustrating the specific structural details of the piston and cylinder assemblies and the brace mechanism associated therewith together with certain details of the running gear mechanism itself;

FIGURE 5 is a fragmental sectional view, on an enlarged scale, illustrating the brace construction pivoted to its folded position illustrating the relationship of the component parts thereof;

FIGURE 6 is a transverse, sectional view taken substantially upon a plane passing along section line 6—6 of FIGURE 4 illustrating the structural details of the pivotal connection between the components of the brace;

FIGURE 7 is a detailed sectional view taken generally longitudinally through the center of the rear running gear illustrating the inclined or diagonal position of the hydraulic piston and cylinder assemblies or rams and the corresponding position of the locking braces;

FIGURE 8 is a fragmental plan view of a portion of one side of the rear running gear illustrating the suspension assembly for the wheels of the running gear together with the structure for attaching the piston and cylinder assemblies and locking braces to the rear running gear;

Figure 1:
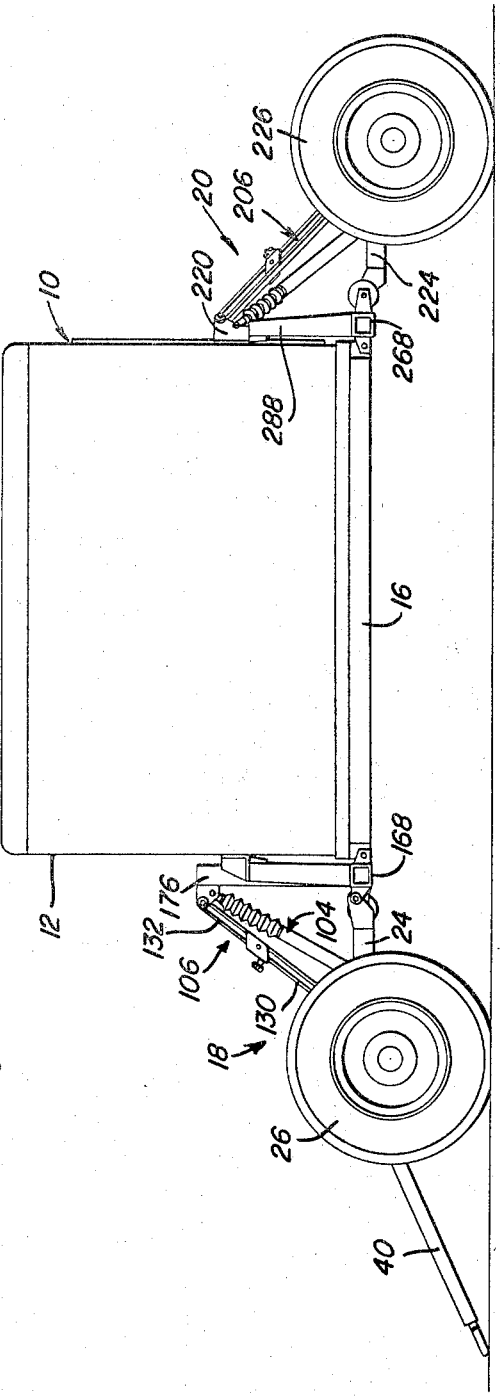
FIGURE 1 is a side elevational view of the detachable running gear of the present invention associated with a body with the body in elevated position.

FIGURE 9 is a detailed sectional view taken generally along the longitudinal center of the tongue and axle of the front running gear illustrating the mechanism for locking the tongue in relation to the axle so that the tongue cannot be pivoted when the tongue is in a downwardly inclined position; and FIGURE 10 is a fragmental top plan view of the construction of FIGURE 9 with portions thereof broken away illustrating further structural details of this construction.

Referring now specifically to the drawings, the numeral 10 generally designates the load carrying body of the present invention which may be any type of enclosure or shelter with the present invention being primarily for the purpose of rendering the load carrying body 10 mobile and easily transportable over various terrain including relatively rough terrain such as military forces quite often encounter. The load carrying body or shelter 10 is of conventional construction and includes a front wall 12 and a rear wall 14. The load carrying body 10 may have sides and a top and must include a rigid bottom structure 16 with the front wall 12 and rear wall 14 being orientated in rigid parallel relation to each other and in substantially perpendicular relation to the bottom structure 16. It is pointed out that the walls may not be necessarily solid panels but may be in the form of any type of rigid upright members associated with a rigid bottom regardless of whether there are side walls or panels or a top wall or panel. Basically, the running gear of the present invention includes a front wheeled assembly 18 and a rear wheeled assembly 20.

The front wheeled assembly 18 includes a transversely extending rigid axle 22 which may conveniently be rectangular or square hollow tubing. Rigidly affixed to the axle 22 is a pair of rearwardly extending support arms 24 which may also be of rectangular or square tubing members or of any other suitable structural material. The arms 24 are identical and are substantially perpendicular to the axle 22 and are in rigid parallel relation to each other. Attached to each end of the axle 22 is a steerable front wheel 26 which includes the usual pneumatic tire and which is of conventional construction and supported by the usual spindle carried by a suspension assembly generally designated by the numeral 28 and which forms no particular part of the present invention except that a steering arm 30 is operatively connected with each of the wheels so that the wheels may be pivoted about a substantially vertical axis as formed by a king pin. Each of the steering arms 30 is connected to a tie rod or drag link 32 by virtue of a tie rod end 34 or equivalent connecting structure. The inner end of each tie rod 30 is connected to a rearwardly extending arm 36 with the connection between the tie rod 32 and the arm 36 being a suitable tie rod end 38 or equivalent connection. The steering structure is symmetrical on both sides of the arm 36 with the arm 36 serving as a pitman arm for imparting pivotal movement of a towing tongue 40 about a substantially vertical axis to the wheel 26 for pivoting the wheel 26 about the vertical axis of the king pin which operatively supports the wheel 26.

As illustrated in FIGURES 9 and 10, the arm 36 is in the form of an extension of a supporting adapter, generally designated by the numeral 42 which is pivotally supported from the axle 22 by a pivot bolt or pin 44 for pivotal movement about a vertical axis perpendicular to the longitudinal axis of the axle 22. The adapter 42 includes a lower plate 46 in the same plane as the arm 36 and an upper plate 48 generally parallel to the lower plate 46. The plan configuration of the adapter is illustrated in FIGURE 3 with the front end of the plates 46 and 48 being interconnected by a vertical web 50 or the like and the intermediate portion of the plates 46 and 48 being interconnected by an intermediate web 52. At the forward upper corner of the adapter 42, there is provided a horizontally disposed bore 53 which receives an elongated pivot pin or bolt 54 that extends through apertured lugs or ears 56 that are rigidly affixed to and extend rearwardly from the end of the tongue 40 adjacent the adapter 42. Thus, the tongue 40 is capable of movement in a vertical plane about a substantially horizontal axis as defined by the pivot pin or bolt 54 and further capable of swinging movement in a generally horizontal plane as defined by the axis of the pivot pin or bolt 44. When the tongue 40 and the adapter 42 is pivoted about the vertical axis defined by the bolt or pin 44, the arms 36 will swing in a horizontal plane about the same vertical axis, that is, the axis of the pin or bolt 44 thus causing linear movement of the tie rod in a well-known manner for pivoting the steerable wheels 26. For the purpose of supporting the pivot bolt 44, the axle 22 is provided with a tubular bearing sleeve 58 extending therethrough and the arm 36 may be thickened as at 60 and the upper plate 48 thickened as at 62 for providing additional bearing support for the pivot pin or bolt 44. Any suitable lubrication means may be provided for the various components of the steering mechanism and the pivotal support for the tongue and adapter assembly as well as the pivotal support for the tongue on the adapter.

Longitudinally slidably disposed in a bore 64 in the vertical web 52 of the adapter and also longitudinally slidably received in a bore 66 in the front wall 50 of an adapter is a lock pin 68 in the form of a cylindrical rod. A coil compression spring 70 encircles a portion of the lock pin or rod 68 and one end of the spring 70 abuts against the front wall of the vertical partition 52. The other end of the spring 70 engages a washer 72 mounted on the lock rod 68 and retained in position thereon by a transverse pin 74. Thus, the lock rod or pin 68 is spring-biased forwardly of the adapter 42 with the washer 72 limiting the forward movement of the rod 68 when it comes into engagement with the inner surface of the front wall 50 of the adapter 42.

The transverse axle 22 includes a pair of rigid L-shaped lugs 76 secured to the front surface of the axle 22 as by welding or the like. The lugs 76 are spaced from each other thus leaving a forwardly opening socket 78 for reception of the rear end of the lock pin or rod 68 as illustrated in FIGURES 9 and 10. Each of the lugs 76 also includes an inclined outer edge 80 forming a ramp for guiding the pin 68 toward the socket 78 during pivotal movement of the tongue about a vertical axis so that the lock pin 68 may be engaged with the socket for locking the adapter 42 from pivoting about a vertical axis defined by the bolt 44 thereby locking the tie rods and steerable wheels to prevent pivotal movement thereof.

The structure for moving the locking pin or rod 68 rearwardly against the action of the spring 70 is in the form of a transverse abutment 82 rigidly fixed to the undersurface of the tongue as by welding 84 so that as the tongue extends downwardly and forwardly such as when it is disconnected from a towing vehicle, the abutment 82 which is in the form of a round cylindrical rod will engage the end of the lock rod 68 which normally projects forwardly beyond the front wall 50 and move it rearwardly so that the lock rod 68 will be forced between the lugs 76 into the socket 78 thus locking the adapter from turning for retaining the tongue, adapter, arm 36 and tie rods 32 as well as the steerable wheels in a fixed position insofar as pivotal movement is concerned. The tongue 40 will normally assume the downwardly inclined position illustrated in FIGURE 9 due to the forces of gravity when the tongue is disconnected from the hitch of a towing vehicle. This structure acts as an automatic steering lockout for locking the steerable wheels in their straight position when the tongue is disconnected from the towing vehicle and allowed to assume a normal downwardly inclined condition.

A lockout mechanism is provided for the steering lock structure and this includes a pivotal latch member 86 supported on a pivot pin 88 extending through one end of the latch member 86 and a pair of lugs 90 welded to the upper wall 48 of the adapter 42. The under edge of the latch bar 86 is provided with a notch 92 for receiving and engaging the horizontal rod portion 94 of an inverted U-shaped element 96 that is rigidly fixed to the top surface of the tongue such as by welding or the like. Thus, when the tongue 40 is orientated in elevated position as indicated in dotted lines in FIGURE 9, the latch bar 86 will engage the keeper 96 in such a manner as to lock the tongue 40 in the elevated position thus enabling the spring 70 to urge the lock rod 68 forwardly into unlocking position so that the wheels may be steered even when the tongue 40 is not attached to a towing vehicle.

The forward end of the latch bar 86 is provided with a cam surface 98 which will automatically elevate the latch bar 86 upwardly when it engages the transverse rod 94 during movement of the transverse rod 94 toward the end of the latch bar 86. The upper forward corner of the latch bar 86 is provided with projecting rods or pins 100 forming a handle for the latch bar 86 which will enable the latch bar 86 to be elevated in order to disengage the notch 92 from the transverse rod 94. Extending between the lugs 90 is a stop bar 102 which limits the downward pivotal movement of the latch bar 86 by virtue of the stop bar underlying and engaging the bottom edge of the latch bar 86 adjacent the pivot point 88 but spaced forwardly therefrom. Thus, the latch bar 86 will be retained in a normal position so that any time the tongue is swung upwardly to the dotted line position, the transverse rod 94 will engage the cam surface 98 and force the latch bar 86 upwardly until the transverse bar 94 drops into the notch 92 whereby the tongue 40 is then locked in elevated position until the latch bar 86 is manually released. Thus, with the previously described construction, there is provided an automatic locking device for the steerable wheels and a manually operated structural arrangement for retaining the tongue in elevated position thereby permitting the steerable wheel to be pivoted even when the running gear of the present invention is not connected to a towing vehicle.

The front running gear 18 is provided with a pair of double-acting hydraulically operated piston and cylinder assemblies 104 and a pair of knee-type lock braces 106 orientated alongside of the piston and cylinder assemblies 104.

As illustrated in FIGURE 4, a piston and cylinder assembly 104 includes a bracket 108 rigidly affixed to the upper surface of a rearwardly extending arm. Attached to the bracket 108 is a cylinder 110 which is pivoted to the bracket by a pivot pin or bolt 112. Disposed within the cylinder 110 is a conventional piston having a piston rod 114 projecting therefrom and extending longitudinally from the cylinder 110. A hydraulic inlet adapter 116 is provided at the bottom of the cylinder 110 and the hydraulic inlet adapter 118 is provided at the upper end of the cylinder 110. The adapters 116 and 118 permit inlet and outlet respectively for enabling expansion and contraction of the piston and cylinder assembly 104. The upper end of the piston rod 114 is attached to a bracket 120 by a pivot pin or bolt 122 and the portion of the piston rod 114 which extends and retracts is protected by a resilient bellows type cover 124 which has the lower end thereof snugly embracing the end of the cylinder 110 and secured thereto in any suitable manner as at 126. The upper end of the bellows type protector is in snug embracing and secured relation to the piston rod 114 as at 128 thus enabling longitudinal reciprocation of the piston rod 114 in the usual manner but preventing dust, dirt and rust from collecting thereon thereby retaining the seal between the piston rod 114 and the end of the cylinder 110 adjacent the adapter 118 in a good condition.

The lock brace 106 includes a lower section 130 and an upper section 132 orientated in longitudinal alignment when in locked position and orientated in angular orientation when in unlocked condition. FIGURE 4 illustrates the brace 106 in locked or operative position and FIGURE 5 illustrates the brace 106 in unlocked or inoperative position. The lower end of the lower section 130 is attached to a bracket 134 for pivotal movement by a pivot pin or bolt 136 while the upper end of the upper section 132 is pivotally attached to the bracket 120 by a pivot pin or bolt 138. The adjacent ends of the sections 130 and 132 are pivotally interconnected by a transverse pin 140 having retaining pins 142 extending through the ends thereof for retaining the transverse pin 140 assembled with the upper and lower sections. As illustrated, the upper section 132 is generally channel-shaped and includes spaced legs 144 and 146 which receive the upper end portion of the lower section 130 as illustrated in FIGURE 6. The web of the channel-shaped lower end portion of the upper section 132 is extended axially as at 148 so that it will normally overlie and engage an outer surface portion of the lower section 130. The free end of the extension 148 is provided with a slot or notch 150 therein which receives a screw-threaded bolt 152 that has an eye member 154 on the inner end thereof pivotally encircling the transverse rod 156 which extends through a channel-shaped socket 158 formed on the upper end of the lower section 130 as illustrated in FIGURE 5. Threaded onto the bolt 152 is a retaining sleeve or nut 160 having a notched hand wheel 162 integral with the upper end thereof so that the retaining nut 160 may be manually rotated on the threaded rod or bolt 152. Thus, by loosening the retaining nut 160, the retaining nut and bolt 152 may be pivoted away from the upper section 132 thus disengaging the nut 160 from the outer surface of the extension 148 thereby enabling the upper and lower sections of the lock brace 106 to pivot away from the piston and cylinder assembly into a collapsed condition as illustrated in FIGURE 5. For retaining the sections 130 and 132 in longitudinal alignment, the lock brace sections are pivoted in alignment when the retaining nut 160 and bolt 152 are pivoted downwardly to lie against one wall of the socket 158 which is inclined. Then, the bolt 152 is pivoted upwardly until it is received within the notch 150 after which the nut or retainer 160 is tightened thus securely retaining the brace 106 in a straight line condition for generally paralleling the piston and cylinder assembly 104 and enabling the bracket 120 and the arm 24 to be locked in a fixed relationship without continuously exerting pressure on the piston and cylinder assembly 104.

The rear end of each arm 24 is provided with a projection 164 which is offset upwardly and rearwardly slightly for reception between a pair of lugs 166 rigid with and extending rearwardly from a transverse tubular cross member 168. The lugs 166 are attached to the projection 164 by a pivot pin or bolt 170. The projection 164 may be in the form of a pair of plates rigidly spaced apart by a tubular sleeve 172 or the like for securing the transverse member 168 pivotally to the rear ends of the arms 24.

Extending upwardly from and rigid with the transverse or cross member 168 in alignment with each of the arms 24 is a vertical arm of frame member 174 that may be in the shape of an I-beam or of hollow configuration and which rigidly supports the rearwardly extending bracket 120 at the upper end. The edge portion of the upstanding frame member or arm 174 which faces the front wall 12 of the shelter unit is inclined away from the front wall as indicated by numeral 176 thus enabling some flexing of the arm or frame member 174 without its engaging the shelter wall 12.

Figure 2:
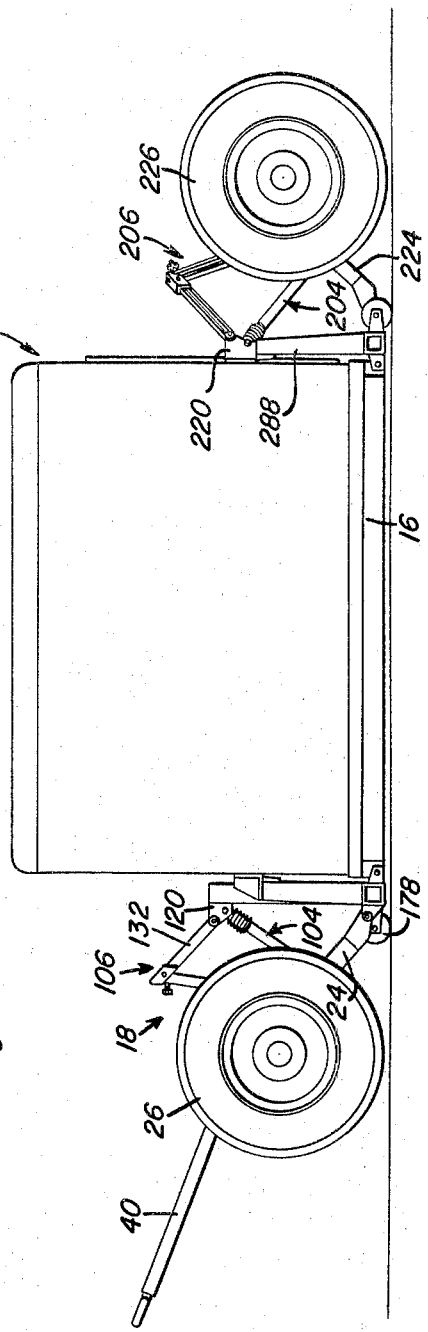
FIGURE 2 is a side elevational view of the assembly of FIGURE 1 illustrating the body and running gear in lowered position with the wheels of the running gear slightly elevated from the ground surface thereby illustrating the significance of the double-acting piston and cylinder assemblies incorporated into the running gear.

With this construction, the cross member 168 may be oriented in the elevated position illlustrated in FIGURES 1 and 4 or in the lowered position illustrated in FIGURE 2. When in the elevated position, the lock brace 106 will be in the straight line condition and will lock the arms 24 and 174 substantially in perpendicular relation. In order to lower the shelter unit and transverse member 168, it is first necessary to release the retaining nut 160 thereby enabling the lock brace 106 to fold to the position illustrated in FIGURE 5 as the piston and cylinder assembly 104 is contracted or permitted to be contracted due to the load of the shelter so that the shelter may be gently lowered. Even after the shelter has been lowered, the double-acting nature of the piston and cylinder assembly 104 enables fluid pressure to be admitted to the adapter 118 and exhausted from the adapter 116 for actually lifting the wheels away from the ground surface as illustrated in FIGURE 2 thus facilitating the changing of wheels or repair of the running gear as may become necessary and also permitting the wheels to clear projections when the shelter or pallet is moved into an aircraft on conveyors or a roller system.

For supporting the transverse cross member 168 from the supporting surface when it is lowered to the position in FIGURE 2, a small dolly wheel 178 is attached to the central portion of the cross member 168 by the use of a pair of brackets 180 so that the running gear may be hand manipulated for bringing it into a desired relationship to the shelter 10 when it is to be connected thereto. This dolly wheel 178 also enables the running gear to be manuevered when the running gears are detached from the shelter unit and connected to each other and orientated in the lowered position. However, when the running gear is in the elevated position as illustrated in FIGURE 1, the dolly wheeel 178 does not engage the ground surface.

The transverse tubular member 168 is provided with a plurality of rearwardly extending generally channel-shaped bracket structures 182 rigidly affixed thereto which have a closed bottom and which telescopically engage with a lug 184 that is rigidly fixed to the rigid bottom 16 and may form a part thereof. A retaining bolt or pin 186 is provided through the assembly bracket 182 and lug 184 thus securing the transverse member 168 to the shelter 10 as illustrated in FIGURE 4. As illustrated in FIGURE 3, a plurality of brackets 182 are provided along the length of the transverse member 168 and it is also noted that the length of the transverse member 168 is substantially equal to the width of the shelter or body 10.

At the outer ends of the transverse tubular member 168, there is provided an upstanding member 188 rigidly fixed to the transverse member 168 in any suitable manner and the upper end of each arm 188 is provided with a bracket 190 attached to the shelter 10 by fastening bolts 192 so that pressure exerted on the upstanding members 174 will be transmitted to the transverse member 168 and thus to the upstanding member 188 for exerting pressure on the body which serves to resist pivotal movement between the shelter unit and the running gear by virtue of the direct attachment which may be other types of fasteners rather than the bolts as illustrated. Thus, in effect, the transverse member 168 and the upstanding members and brackets attached thereto become unitary with the shelter unit so that as the piston and cylinder assembly is expanded and contracted, the arms 24 and the shelter unit including the transverse member 168 fixedly attached thereto will pivot relative to each other about the pivot pin 170 for movement between the elevated and lowered position.

The rear running gear 20 has components which are substantially the same as the front running gear and includes a transverse axle 222, supporting wheels 226 journalled on conventional spindles at the outer end of the axle and supported therefrom by a suitable suspension structure 228. The wheels 226 are not steerable but are suspended by a similar suspension mechanism 228 to the suspension mechanism 28 employed for the front steerable wheels 26. Rigid with the axle 222 are forwardly extending arms 224 pivotally connected to a transverse tubular member 268 by a pivotal connection 270 which corresponds with the transverse member 168 and the pivotal connection 170 illustrated in FIGURE 4. The transverse tubular member 268 is provided with a plurality of bracket 282 similar to the brackets 182 in FIGURE 4 and for the same purpose. Extending upwardly and in an outward inclined manner from the arms 224 is a lock brace assembly 206 and a double-acting piston and cylinder assembly 204 similar to the lock brace 106 and piston and cylinder assembly 104 in FIGURE 4. The lower end of the lock brace 206 and piston and cylinder assembly 204 are connected to a single U-shaped bracket structure 208 by pivot pins 212 and 236 respectively. The upper end of the lock brace 206 and the piston and cylinder assembly 204 are both connected to a bracket structure 220 carried by the upper end of a pair of upstanding members 288 rigidly affixed at their lower ends to the transverse member 268. The upper end of the brace member 206 is pivotally connected to the bracket 220 by a pivot pin 223 while the upper end of the piston and cylinder assembly 204 is pivotally connected to the upstanding member 288 by a pivot pin 238. As illustrated in FIGURE 3, the outward and upward inclination of the piston and cylinder assembly 204 and the lock braces 206 provides for access to a door in the back wall 14 of the shelter. The details of the door are not illustrated but the orientation of the supporting structure is such that access may be gained to the door by walking along the top surface of a deck plate 225 which is supported by the axle 222 and bracket elements 227 and 229. The rear arms 224 are interconnected by transverse frame members 231 which serves to rigidify the structure of the arms and also forms a support for the deck 225.

A supporting plate 233 is carried by the arm 224 and axle 222 and the plate 233 supports a pump 235 having a manually operated handle 237 connected thereto and a control valve 239 operatively associated therewith. The brackets 182 are connected to the shelter at the bottom thereof at the front and the brackets 282 are connected in a similar manner at the back of the shelter. Also, the upstanding members 220 are fixed to the shelter by fasteners of the bolt type or the like. The particular manner of attaching the running gear to the shelter may be varied as can the particular strength and size requirements depending upon the loads to be carried. A similar pump 194 is supported from a support plate 196 on one of the front arms 24 and is provided with an actuating handle 198 and a control valve 200 for controlling the front running gear through suitable hydraulic hoses coupled to the piston and cylinder assembly. The front axle 22 is provided with a plurality of attaching rings 292 rigidly affixed thereto for attaching safety chains or the like while the rear axle 222 may be provided with a hook or loop 204 for connecting another running gear thereto or another vehicle thereto for towing in tandem relation.

The running gears may be interconnected when they are not connected with a shelter unit for transport to a desired location for use by connecting the brackets 182 and 282 together. Various ancillary items and accessories normally required for over the road operation may be provided such as reflector elements, brake lights, running, lights, brakes and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a demountable running gear assembly used in combination with a body unit including a rear wheeled assembly and a front wheeled assembly, each wheeled assembly including an axle with wheeled units mounted on the outer ends thereof, a pair of laterally extending substantially parallel arms rigid with the axle, means connecting the ends of the arms remote from the axle to the body unit for relative pivotal movement therebetween, that improvement comprising a fluid pressure operated piston and cylinder assembly connected to each of said arms in spaced relation to the point of connection between the arms and body unit, means connected to the end of each piston and cylinder assembly remote from the point of connection thereof to the arm for attachment to the body unit in spaced relation to the point of connection between the body unit and arms whereby expansion and contraction of the piston and cylinder assembly will effect raising and lowering of the body unit, said piston and cylinder assemblies on at least one of said wheeled assemblies extending upwardly in a diverging relationship towards the body unit to provide access to the body unit over a lateral dimension greater than the distance between said arms, foldable brace means interconnecting each of said arms and the means at the outer end of the piston and cylinder assemblies for locking the piston and cylinder assemblies in extended position, said brace means including a pair of pivotally interconnected sections, abutment means on one of said sections to limit the pivotal movement of the sections relaive tto each other in one direction to a straight line condition, and releasable means on the other section for locking engagement with the abutment means on said one section when the sections are in alignment with each other for locking the sections in alignment with each other for locking the sections in alignment thereby enabling the body unit to be retained in elevated position without retaining pressure in the piston and cylinder assemblies.

2. The structure as defined in claim 1 wherein said front wheeled assembly includes steerable wheels, a tongue extending forwardly from the front axle, means operatively connecting the tongue and the front wheels for pivoting the front wheels about substantially vertical axes when the tongue is swung horizontally, means pivotally supporting the tongue from the axle for pivotal movement about a horizontal axis, and means operatively interconnecting the tongue and the front axle for locking the tongue against pivotal movement about substantially a vertical axis when the tongue is disconnected from a towing vehicle and pivoted about a horizontal axis.

3. In a demountable running gear assembly used in combination with a body unit including a rear wheeled assembly and a front wheeled assembly, each wheeled assembly including an axle with wheeled units mounted on the outer ends thereof, a pair of laterally extending substantially parallel arms rigid with the axle, means connecting the ends of the arms remote from the axle to the body unit for relative pivotal movement therebetween, that improvement comprising a fluid pressure operated piston and cylinder assembly connected to each of said arms in spaced relation to the point of connection between the arms and body unit, means connected to the end of each piston and cylinder assembly remote from the point of connection thereof to the arm for attachment to the body unit in spaced relation to the point of connection between the body unit and arms whereby expansion and contraction of the piston and cylinder assembly will effect raising and lowering of the body unit, said piston and cylinder assemblies on at least one of said wheeled assemblies extending upwardly in a diverging relationship towards the body unit to provide access to the body unit over a lateral dimension greater than the distance between said arms, foldable brace means interconnecting each of said arms and the means at the outer end of the piston and cylinder assemblies for locking the piston and cylinder assemblies in extended position, said brace means including a pair of pivotally interconnected sections, abutment means on one of said sections to limit the pivotal movement of the sections relative to each other in one direction to a straight line condition, and releasable means on the other section for locking engagement with the abutment means on said one section when the sections are in alignment with each other for locking the sections in, alignment thereby enabling the body unit to be retained in elevated position without retaining pressure in the piston and cylinder assemblies, said front wheeled assembly including steerable wheels, a tongue extending forwardly from the front axle, means operatively connecting the tongue and the front wheels for pivoting the front wheels about substantially vertical axes when the tongue is swung horizontally, means pivotally supporting the tongue from the axle for pivotal movement about a horizontal axis, and means operatively interconnecting the tongue and the front axle for locking the tongue against pivotal movement about substantially a vertical axis when the tongue is disconnected from a towing vehicle and pivoted about a horizontal axis, said means interconnecting the tongue and front axle including a socket formed on the front axle, a lock rod movable into and out of said socket and movable with said tongue about substantially a vertical axis, said tongue being supported for pivotal movement about a transverse axis so that when the tongue is detached from a towing vehicle, gravity will cause the tongue to pivot downwardly toward the ground surface, an abutment member on said tongue engaging said lock rod for moving the lock rod into engagement with the socket when the tongue is orientated in downwardly inclined position thereby locking the tongue and locking the steerable wheels.

4. The structure as defined in claim 7 together with a latch means operatively interconnecting the tongue and axle for latching the tongue in upwardly elevated position when detached from a towing vehicle thereby rendering the tongue locking mechanism inoperative.

5. The structure as defined in claim 1 together with a plate mounted between said arms having the diverging piston and cylinder assemblies attached thereto for providing a step when gaining access to the body unit.

6. In a demountable running gear assembly used in combination with a body unit including a rear wheeled assembly and a front wheeled assembly, each wheeled assembly including an axle with wheels mounted on the outer ends thereof with the front wheels being steerable, a pair of laterally extending substantially parallel arms rigid with the axle, means connecting the ends of the arms remote from the axle to the body unit for relative pivotal movement therebetween, that improvement comprising a tongue pivoted to the axle for movement in a vertical-plane and operatively connected to the front wheels, and means operative in response to disconnection of the tongue from a towing vehicle and movement in a vertical plane to lock the front wheels from pivotal movement.

7. In a demountable running gear assembly used in combination with a body unit including a rear wheeled assembly and a front wheeled assembly, each wheeled assembly including an axle with wheels mounted on the outer ends thereof with the front wheels being steerable, a pair of laterally extending substantially parallel arms rigid with the axle, means connecting the ends of the arms remote from the axle to the body unit for relative pivotal movement therebetween, that improvement comprising a tongue pivoted to the axle for movement in a vertical plane and operatively connected to the front wheels, and means operative in response to disconnection of the tongue from a towing vehicle and movement in a vertical plane to lock the front wheels from pivotal movement, tongue and axle including interlocking means for locking the tongue in elevated position for rendering the front wheel locking means inoperative.

8. In a demountable running gear assembly used in combination with a body unit including a rear wheeled assembly and a front wheeled assembly, each wheeled assembly including an axle with wheels mounted on the outer ends thereof with the front wheels being steerable, a pair of laterally extending substantially parallel arms rigid with the axle, means connecting the ends of the arms remote from the axle to the body unit for relative pivotal movement therebetween, that improvement comprising a tongue pivoted to the axle for movement in a vertical plane and operatively connected to the front wheels, and means operative in response to disconnection of the tongue from a towing vehicle and movement in a vertical plane to lock the front wheels from pivotal movement, locking means for the front steerable wheels including a socket member fixed to said axle, a moveable adapter supported from said axle and forming a pivotal support for said tongue, a movable lock rod mounted on said adapter and engageable with said socket, and means on said tongue engageable with said rod for moving it into engagement with said socket.

9. The structure as defined in claim 8 wherein said rod is spring biased away from said socket, said means on said tongue including a transverse abutment member operative to move the rod when the tongue extends downwardly.

10. In a demountable running gear assembly used in combination with a body unit including a rear wheeled assembly and a front wheeled assembly, each wheeled assembly including an axle with wheeled units mounted on the outer ends thereof, a pair of laterally extending substantially parallel arms rigid with the axle, means connecting the ends of the arms remote from the axle to the body unit for relative pivotal movement therebetween, that improvement comprising a fluid pressure operated piston and cylinder assembly connected to each of said arms in spaced relation to the point of connection between the arms and body unit, means connected to the end of each piston and cylinder assembly remote from the point of connection thereof to the arm for attachment to the body unit in spaced relation to the point of connection between the body unit and arms whereby expansion and contraction of the piston and cylinder assembly will effect raising and lowering of the body unit, and a foldable lock brace interconnecting each arm and the means connected to each piston and cylinder assembly at the end thereof remote from said arms, said lock brace generally paralleling said assemblies, said lock brace including a pair of pivotally interconnected members, and manually operated means selectively securing said members in aligned position.

11. In a demountable running gear assembly used in combination with a body unit including a rear wheeled assembly and a front wheeled assembly, each wheeled assembly including an axle with wheeled units mounted on the outer ends thereof, a pair of laterally extending substantially parallel arms rigid with the axle, means connecting the ends of the arms remote from the axle to the body unit for relative pivotal movement therebetween, that improvement comprising a fluid pressure operated piston and cylinder assembly connected to each of said arms in spaced relation to the point of connection between the arms and body unit, means connected to the end of each piston and cylinder assembly remote from the point of connection thereof to the arm for attachment to the body unit in spaced relation to the point of connection between the body unit and arms whereby expansion and contraction of the piston and cylinder assembly will effect raising and lowering of the body unit, and a foldable lock brace interconnecting each arm and the means connected to each piston and cylinder assembly at the end thereof remote from said arms, said lock brace generally paralleling said assemblies, said lock brace including a pair of pivotally interconnected members, and manually operated means selectively securing said members in aligned position, said manually operated means including a longitudinally extending abutment on one of said members extending beyond the point of pivotal interconnection between the members to limit pivotal movement of the members in relation to each other in one direction to a straight line condition, a lock member on the other of said members engageable with the extending abutment when the abutment is operative to retain the members in alignment thereby releasably locking the members in alignment to prevent folding thereof, said abutment including a slot extending to the edge thereof, said locking member including a pivotal bolt having a threadedly attached knob thereon movable into the notch and retaining the abutment in operative position thereby preventing pivotal movement of the members in relation to each other in both directions.

12. In a towed vehicle having a tongue for connection with a towing vehicle and wheeled units thereon, means operative in response to disengagement of the tongue from the towing vehicle to lock the wheeled units, said wheeled units being steerable, axle means supporting the wheeled units, said tongue being connected to the axle means for horizontal and vertical swinging movement, said means for locking the wheeled units being operative in response to a vertical swinging movement of the tongue to a downwardly inclined position resulting from the effect of gravity to lock the steerable wheels to prevent steering movement thereof.

13. In a demountable running gear combined with a body unit and including a rear wheeled assembly and a front wheeled assembly, each wheeled assembly including an axle with a wheel journalled on each outer end thereof, a pair of laterally extending substantially parallel arms rigid with each axle, means pivotally connecting the ends of the arms remote from the axles to the body unit for relative pivotal movement therebetween, a fluid pressure operated piston and cylinder assembly pivotally connected to each of said arms in spaced relation to the point of connection between the arms and body unit, means connecting the other end of each of said piston and cylinder assemblies to the body unit for relative pivotal movement at a point spaced from the point of attachment between the arms and the body units whereby expansion and contraction of the piston and cylinder assemblies will raise and lower the body units, the wheel units on the front wheel assembly being steerable about substantially vertical axes, the front wheeled assembly including a forwardly extending tongue attached to the axle for horizontal swinging movement, means interconnecting the tongue and the front steerable wheels for steering the front wheels in response to horizontal swinging movement of the tongue, those improvements consisting of orientation of the piston and cylinder assembly on the rear wheels assembly in upwardly diverging relationship with the means connecting the piston and cylinder assemblies to the body unit being orientated at the outer edges of the body unit to enable access to a lateral dimension of the body unit in excess of the lateral distance between the arms, the piston and cylinder assemblies being double-acting whereby the axles and wheeled units on the outer ends thereof may be elevated above a supporting surface when the body unit is resting on such a supporting surface to enable replacement of a wheeled unit, the piston rod of each of said double-acting piston and cylinder assemblies being provided with a flexible protective bellows enclosing the piston rod for maintaining the piston rod clean during exertion of fluid pressure on both sides of the piston, foldable brace means interconnecting each of said arms and the body unit and being orientated alongside of the piston and cylinder assemblies, each of the brace means including a pair of pivotally interconnected sections, an abutment on one of said sections for engaging the other section to prevent it from moving in one direction past an aligned condition with the other section, and lock means on other of said sections engaging the abutment to retain the abutment engaged with the other of said sections thereby retaining said sections in alignment.

References Cited

UNITED STATES PATENTS

| | | | |
|---|---|---|---|
| 1,328,048 | 1/1920 | Knapp | 280—445 X |
| 1,574,469 | 2/1926 | Clement | 280—445 |
| 2,537,521 | 1/1951 | Forbes | 280—445 X |
| 2,590,962 | 4/1952 | Gurten et al. | 280—445 X |
| 2,968,490 | 1/1961 | Baus | 296—35 X |
| 3,189,363 | 6/1965 | Pierrat | 280—35 |
| 3,193,301 | 7/1965 | Talbert et al. | 280—43.23 |
| 3,243,193 | 3/1966 | Fulmer et al. | 280—43.23 X |

FOREIGN PATENTS

| | | |
|---|---|---|
| 510,321 | 2//1955 | Canada. |

LEO FRIAGLIA, *Primary Examiner.*

MILTON BUCHLER, BENJAMIN HERSH, *Examiners.*

C. C. PARSONS, J. SIEGEL, *Assistant Examiners.*

Disclaimer and Dedication 3,378,276.—*George M. Fulmer*, Silver Spring, Md. HYDRAULICALLY OPERATED DEMOUNTABLE RUNNING GEAR WITH DIAGONAL RAMS. Patent dated Apr. 16, 1968. Disclaimer and Dedication filed Jan. 26, 1983, by the assignee, *The Union Corp.*

Hereby disclaims and dedicates to the Public the term subsequent to Apr. 16, 1985.

[*Official Gazette February 26, 1985.*]